(12) United States Patent
Pell et al.

(10) Patent No.: US 10,591,106 B2
(45) Date of Patent: Mar. 17, 2020

(54) MOUNTING KIT FOR DISPLAY DEVICE

(71) Applicant: Facebook, Inc., Menlo Park, CA (US)

(72) Inventors: Oliver Pell, London (GB); Peter John Richard Gilbert Bracewell, Isleworth (GB); Chuankeat Kho, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 227 days.

(21) Appl. No.: 15/678,983

(22) Filed: Aug. 16, 2017

(65) Prior Publication Data
US 2019/0056058 A1    Feb. 21, 2019

(51) Int. Cl.
| | |
|---|---|
| *G06F 1/16* | (2006.01) |
| *F16M 11/04* | (2006.01) |
| *F16M 13/02* | (2006.01) |
| *G09F 3/20* | (2006.01) |
| *F16M 11/16* | (2006.01) |

(52) U.S. Cl.
CPC ............ *F16M 11/04* (2013.01); *F16M 11/16* (2013.01); *F16M 13/02* (2013.01); *G06F 1/1601* (2013.01); *G09F 3/208* (2013.01); *G06F 2200/1612* (2013.01)

(58) Field of Classification Search
CPC ...... F16M 11/04; F16M 13/02; G06F 1/1601; G06F 3/208; G06F 2200/1612; G06F 1/1613; G06F 1/1614
USPC .. 248/917, 919–923, 214, 215, 220.21, 489, 248/496
See application file for complete search history.

(56) References Cited

U.S. PATENT DOCUMENTS

| | | | |
|---|---|---|---|
| 5,013,596 A * | 5/1991 | Kessler | E04F 19/026 24/293 |
| 5,924,790 A * | 7/1999 | Ponton | B60Q 1/2626 362/365 |
| 6,651,943 B2 * | 11/2003 | Cho | F16M 11/105 248/122.1 |
| 7,580,248 B2 * | 8/2009 | Ogawa | H04N 5/64 248/917 |
| 8,670,232 B2 * | 3/2014 | Bliven | F16M 11/041 248/917 |
| 8,690,111 B2 * | 4/2014 | Huang | F16M 11/041 248/276.1 |
| 8,827,219 B2 * | 9/2014 | Kessler | F16M 11/048 248/187.1 |
| 9,027,893 B2 * | 5/2015 | Cheng | F16M 13/022 248/201 |
| 2004/0232298 A1 * | 11/2004 | Bremmon | F16M 11/10 248/281.11 |
| 2006/0050471 A1 * | 3/2006 | Chen | G06F 1/1601 361/679.22 |

(Continued)

*Primary Examiner* — Nkeisha Smith
(74) *Attorney, Agent, or Firm* — Fenwick & West LLP

(57) ABSTRACT

A display system includes a display device having a wedge base to enable the display device to rest on a horizontal surface or to be mounted to a vertical surface in a number of different mounting configurations. A mounting kit provides parts usable to mount the display device to a wall or door jam in alternative ways. The mounting kit includes several modular parts, where many of the parts are usable in multiple mounting configurations, thereby reducing the number of parts needed for the kit. The mounting configurations include paths for cables to hide them when the display is installed.

19 Claims, 13 Drawing Sheets

(56) References Cited

U.S. PATENT DOCUMENTS

| | | | |
|---|---|---|---|
| 2010/0132122 A1* | 6/2010 | Hollingshead | A47C 21/003 5/658 |
| 2011/0147553 A1* | 6/2011 | Ostermeier | F16B 5/125 248/223.41 |
| 2016/0031382 A1* | 2/2016 | Chinn | B60P 7/0815 248/222.11 |
| 2019/0032843 A1* | 1/2019 | Burton | F16M 13/02 |
| 2019/0059582 A1* | 2/2019 | Trusty | A47B 81/005 |

* cited by examiner

MOUNTING KIT FOR DISPLAY DEVICE

BACKGROUND

This disclosure relates generally to a display system and more specifically to a mounting kit for mounting a display device.

Digital display devices have become increasingly more prevalent as the devices become less expensive to manufacture. Many such devices may include touchscreens or other input mechanism and may be connected via wired or wireless networks to enable them to provide an increasingly large range of functions. Nevertheless, conventional mechanisms for mounting such devices are overly cumbersome and inflexible.

SUMMARY

A display system includes a display device and a mounting kit for mounting the display device in a variety of mounting configurations. In an embodiment, a display device comprises a display panel, a wedge base, and an electrical interface. The wedge base extends from a back of the display panel and has a depth that increases with distance from an edge of the display panel. The wedge base may furthermore have a substantially cylindrical cross-section. The electrical interface may be located in a cavity of the wedge base for coupling to a data cable.

A mounting kit may include at least device-side bracket and a wall-side bracket. The device-side bracket is structured to couple to a back of the wedge base and includes a first mating structure. The wall-side bracket is structured to couple to a mounting surface and includes a second mating structure structured to mate with the first mating structure to secure the device-side bracket to the wall-side bracket.

The device-side bracket may comprise a flat plate for contacting a back surface of the device and may include one or more fastener holes to enable one or more device-side fasteners to secure the flat plate to the back surface of the display device. The device-side bracket further includes horizontal hooked edges extending away from the back surface of the device.

Wall-side brackets with different form factors may interchangeably couple to the device-side bracket. For example, a short wall-side bracket may have approximately the same length and width as the device-side bracket. Here, mounting fasteners for mounting the wall-side bracket to the mounting surface are positioned so that the mounting fasteners secure to the mounting surface directly behind the display device.

In another configuration, an extended wall-side bracket includes a flat plate having a greater horizontal length than the flat plate of the device-side bracket. The extended wall-side bracket has mounting fastener holes through a first portion of the extended wall-side bracket and horizontal grooves adjacent to top and bottom edges of the flat plate for mating with the hooked edges of the device-side bracket on a second portion of the extended wall-side bracket laterally offset from the mounting fastener holes. This enables the device to be mountable at a position laterally offset from the mounting holes. Using the extended wall-side bracket, the display device is mountable in a first mounting configuration such that the flat plate contacts the mounting surface and the mounting fasteners pass through the mounting holes to secure the flat plate to the mounting surface.

In a mounting configuration for mounting the display device over a surface protruding from the wall (e.g., a door jamb), the mounting kit may include a spacer between the first portion of the wall-side bracket and the non-protruding portion of the mounting surface. Here, the display device is positioned over the protruding surface and the wall-side bracket secures to the base surface of the mounting surface.

The extended wall-side bracket may also include a protrusion in between the grooves of the flat plate on the first portion of the extended wall-side bracket for mating with a reciprocal notch of a side mount. In this mounting configuration, the flat plate of the extended wall-side bracket is perpendicular to the mounting surface and the mounting fasteners pass through the mounting holes to secure the flat plate to a side arm of the side mount extending perpendicular to the mounting surface.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A display system includes a display device having a wedge base to enable the display device to rest on a horizontal surface or to be mounted to a vertical surface in a number of different mounting configurations. A mounting kit provides parts usable to mount the display device to a wall, door jam, or other surfaces in alternative ways. The mounting kit includes several modular parts, where many of the parts are usable in multiple mounting configurations, thereby reducing the number of parts needed for the kit. The mounting configurations include paths for cables to hide them when the display is installed.

Figure 1A:
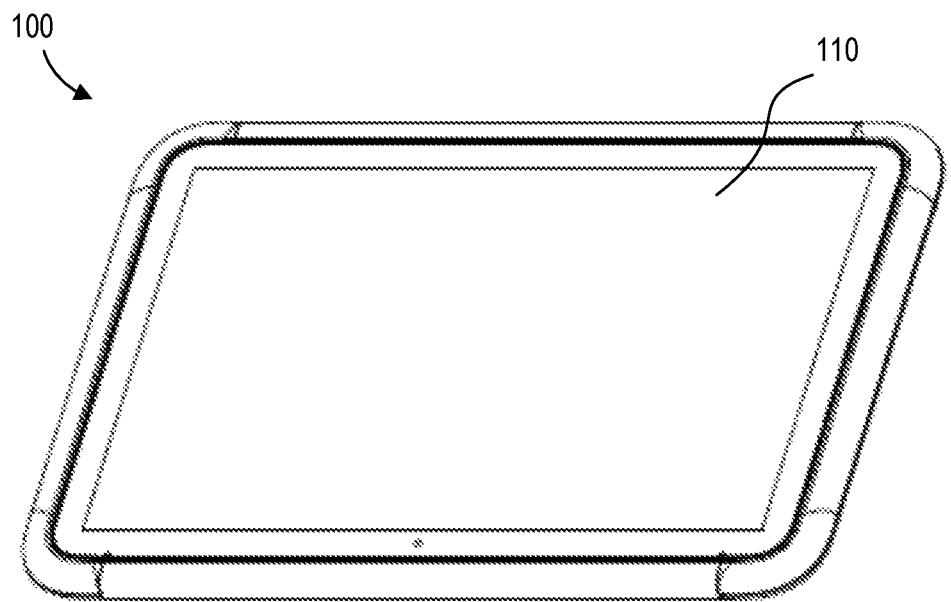
FIG. 1A illustrates a first view of a display device in accordance with one embodiment.
Figure 1B:
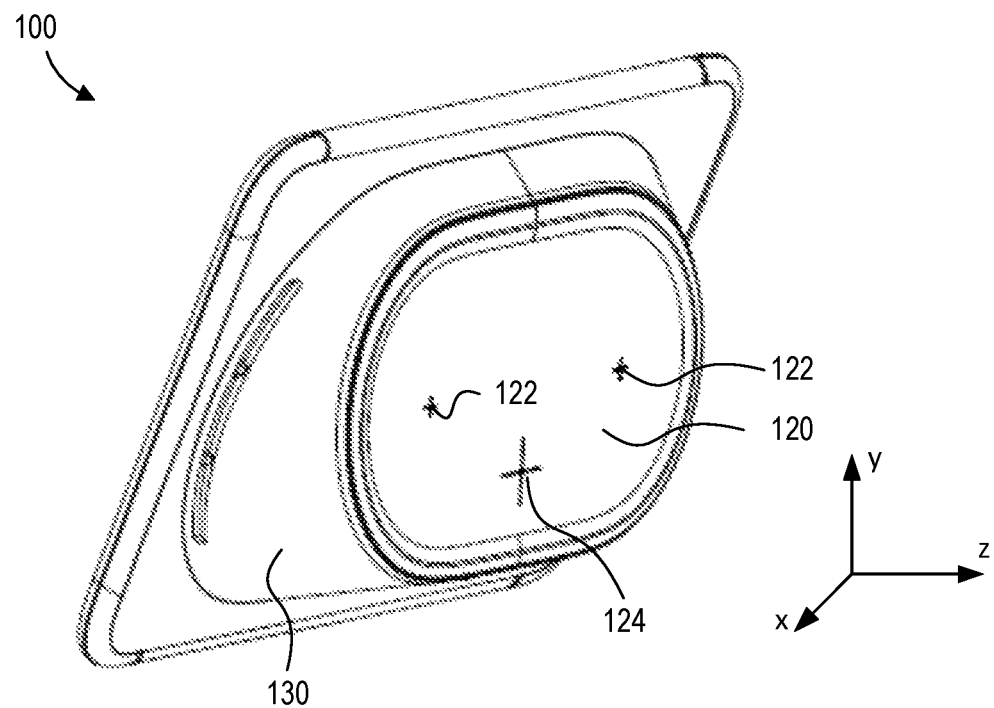
FIG. 1B illustrates a second view of the display device in accordance with one embodiment.

FIGS. 1A and 1B illustrate a front perspective view and a rear perspective view respectively of a display device 100. The display device comprises a display panel 110, a wedge base 130, and a removable back cover 120.

The display panel 110 comprises an array of pixels for displaying images and/or video. For example, the display panel 110 may comprise, for example, a liquid crystal display (LCD), light-emitting diode (LED) display, organic light-emitting diode (OLED) display, or other display technology. The display panel 110 may furthermore include an integrated touch sensor such as a mutual capacitance touch sensor, a self-capacitance touch sensor, an inductive touch sensor, or other touch sensory technology. In an embodiment, the display panel 110 may comprise a substantially rectangular panel. The display panel 110 may be configured to display images or video in any orientation. For example, the display panel 110 may detect its orientation (e.g., using a gyroscope, other orientation sensor, or manual input) and automatically display images such that the top of the image is displayed at the top of the display panel (relative to the ground) such that the image appears in correct orientation for the viewer regardless of the orientation of the display device 100.

The wedge base 130 extends from a back surface of the display panel 110. The wedge base 130 may comprise a substantially oval cross-section through a first plane (e.g., an x-y plane) with a height (e.g., y-direction) and width (e.g., x-direction) that both decrease with distance from the back surface of the display panel 110 so as to comprise a partial quasi-conical structure. Additionally, the depth (e.g., z-direction) of the wedge base 130 increases with distance from a top edge of the back surface of the display panel 110 such that the wedge base 130 has a wedge-like cross-section with through a second plane (e.g., a y-z plane) perpendicular to the first plane.

A removable back cover 120 couples to the wedge base 130. The removable back cover 120 comprises a substantially oval-shaped plate having a width and height (e.g., x-y plane) that substantially conforms to the width and height of the wedge base 130 at the rear portion of the wedge base 130. The removable back cover 120 may be structured to mate with the edges of the wedge base 130 such that the removable back cover 120 can be secured in place. The removable back cover 120 comprises one or more fastener pass-throughs 122 that can be used to affix the display device 100 to a mounting service as will be described in further detail below. Furthermore, the removable back cover 120 comprises a cable pass-through 124 that allows a cable to pass through the removable back cover 120 as described in further detail below. In an embodiment, the pass-throughs 122, 124 may comprise a set of perpendicular slits arranged in a cross pattern through a soft plastic or other pliable materials such that the plastic deforms to enable the fasteners (e.g., screws) or cable to pass through the removable back cover 120.

Figure 1C:
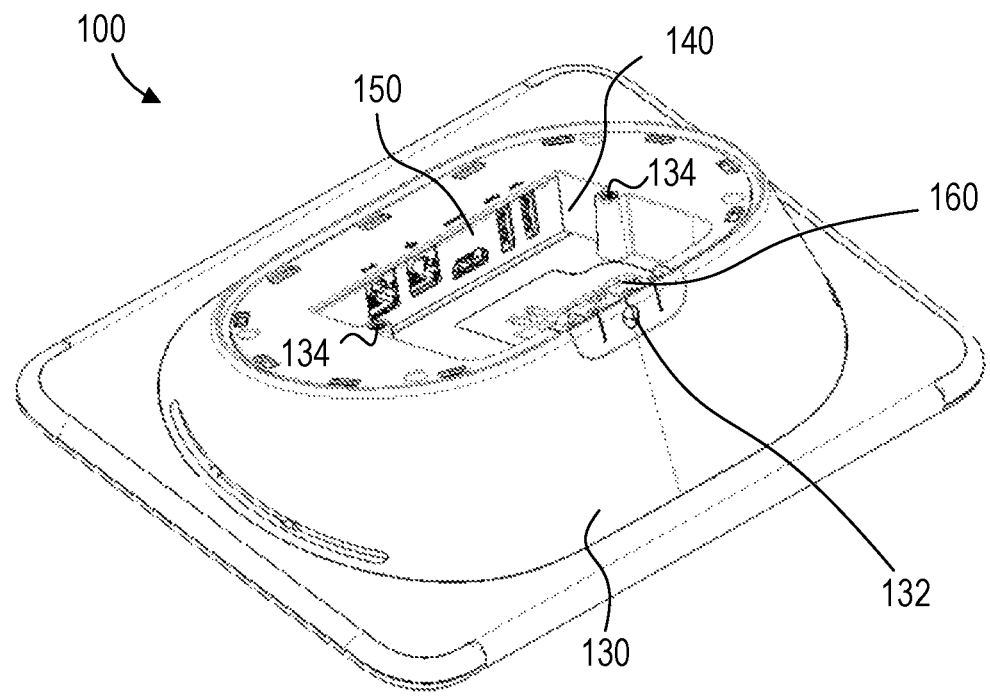
FIG. 1C illustrates a third view of the display device with a back cover removed in accordance with one embodiment.

FIG. 1C illustrates an embodiment of the display device 100 with the removable back cover 120 removed. As illustrated in the view of FIG. 1C, the wedge base 130 includes a cavity 140 that includes one or more electrical interfaces 150. The electrical interfaces 150 may include, for example, an Ethernet port, a Power-Over-Ethernet (POE) port, an HDMI port, a Universal Serial Bus (USB) port, or other port for coupling to a cable to provide power to the display device 100 and/or communicate data to and from the display device 100. In one embodiment, the electrical interfaces 150 are included on an interior surface of the cavity 140 corresponding to the side of the wedge base 130 with greater depth (e.g., along the z-direction).

The wedge base 130 may furthermore comprise a set of fastener holes 134 (e.g., screw holes) adjacent to opposite edges of the cavity 140 that align with the fastener pass-throughs 122 of the removable back cover 120 when attached.

The wedge base 130 may furthermore comprise a cable pass-through 132 at an edge of the wedge base 130 opposite the electrical interfaces 150 that may enable a cable to pass through the wedge base 130 below the removable back cover 120 in certain configurations as described in further detail below.

Figure 2A:
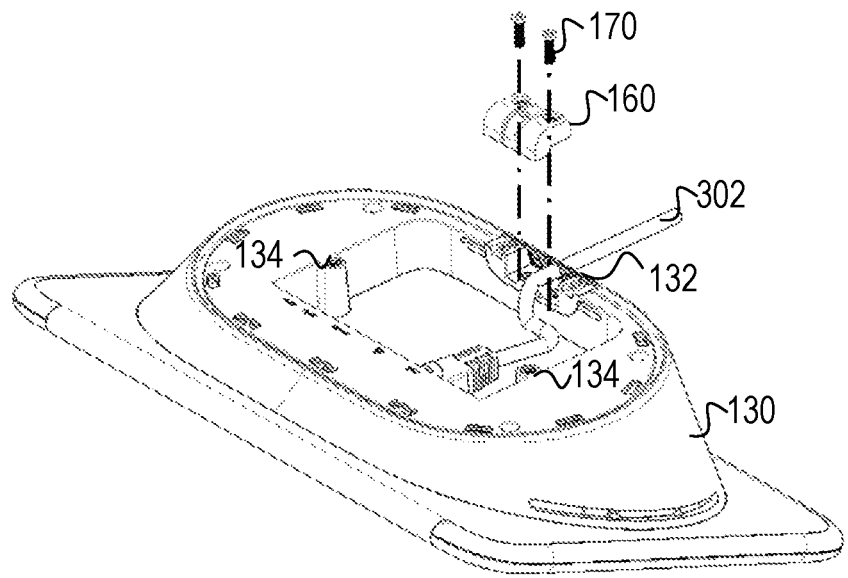
FIG. 2A illustrates the display device with cable holders removed in accordance with one embodiment.
Figure 2B:
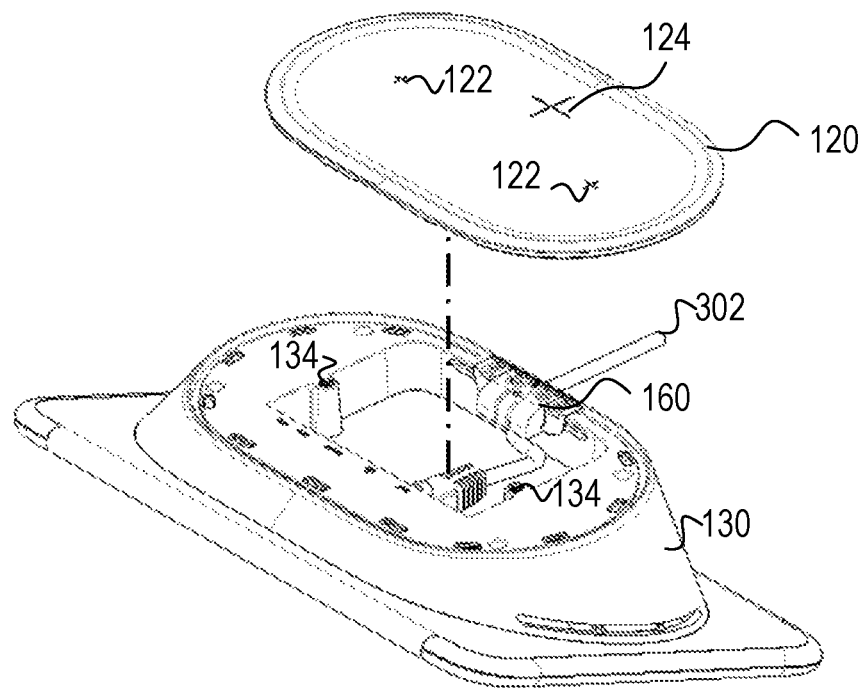
FIG. 2B illustrates the display device with the cable holders securing a cable in accordance with one embodiment.
Figure 2C:
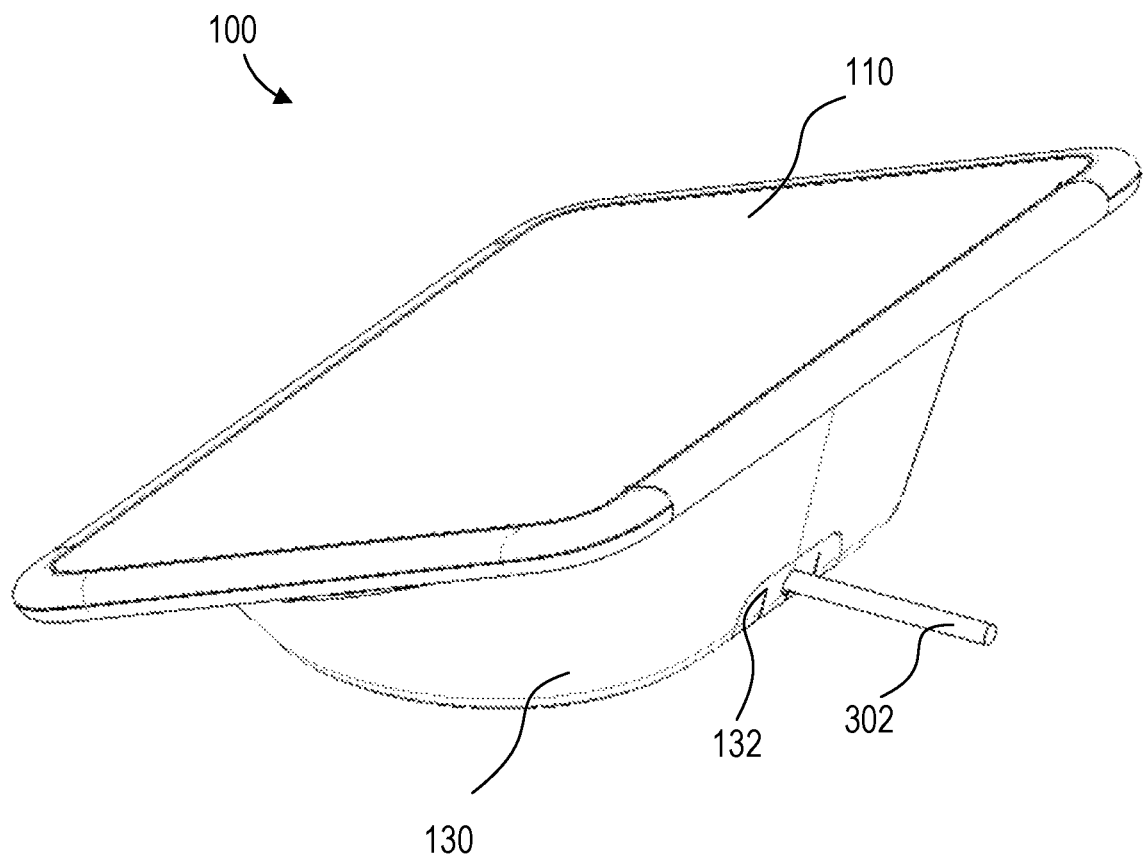
FIG. 2C illustrates the display device in a configuration for resting on a horizontal surface in accordance with one embodiment.

FIG. 2A-2C illustrate an embodiment of a mounting configuration for positioning the display device 100 on a flat horizontal surface such as a desktop or table top. In FIG. 2A a cable holder 160 is shown removed from the wedge base 130 adjacent to the cable pass-through 132 by removing fasteners 170 (e.g., screws). A cable 302 is inserted through the cable pass-through 132 in the side of the wedge base 130 and plugged into the electrical interface 150.

FIG. 2B illustrates the display device 100 with the cable holder 160 secured back in place using the fasteners 170. In this configuration, the cable 302 is secured in place and the removable back cover 120 may be installed without interference from the cable 302.

FIG. 2C illustrates the display device 100 positioned on a flat horizontal surface such as a desktop or table top. As can be seen, in this position, the display panel 110 is oriented at an angle relative to the horizontal surface so that it is easily viewable from a position above the surface. Furthermore, the cable 302 extends through the cable pass-through 132 of the wedge base 130 inside the removable back cover 120 so that the back surface of the removable back cover 120 can be fully in contact with the horizontal surface, thus enabling the display device 100 to rest on the surface in a stable position.

In the configuration of FIGS. 2A-C, the display device 100 is oriented such that the top side of the display panel 110 (furthest edge from the horizontal surface) is opposite the side of the wedge base 130 having greater depth (e.g., along the z-direction). The display panel 110 may automatically detect this orientation and display the top of the image at the top of the display panel 110 so that the image appears in the proper orientation to the viewer.

Figure 3A:
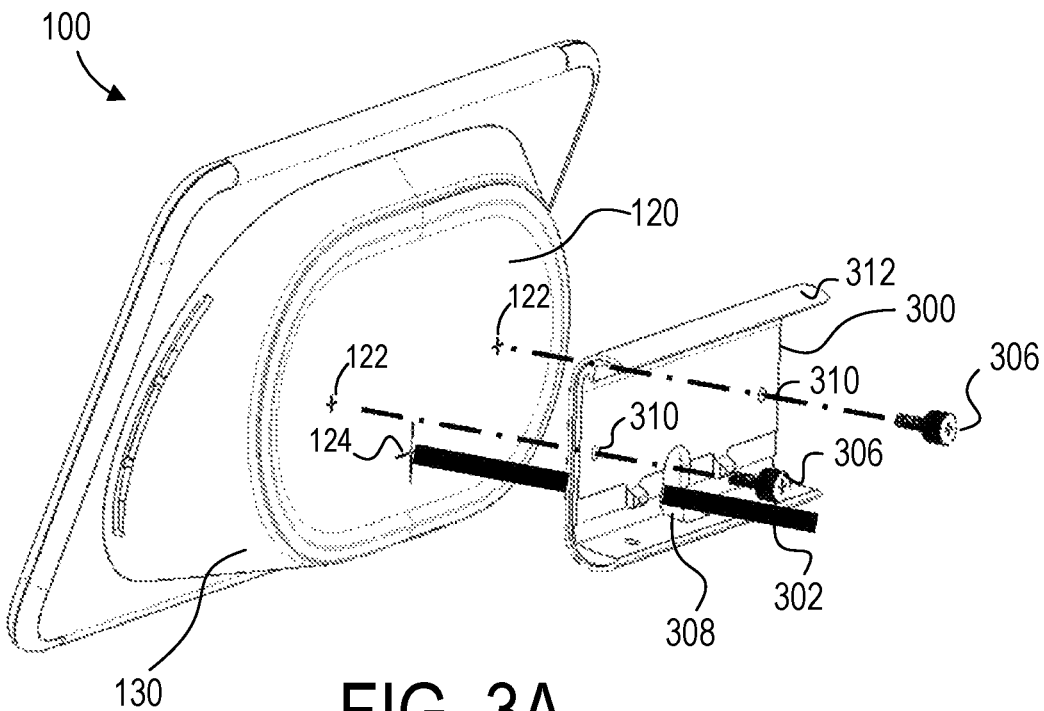
FIG. 3A illustrates an exploded view of the display device and a device-side mounting bracket in accordance with one embodiment.
Figure 3B:
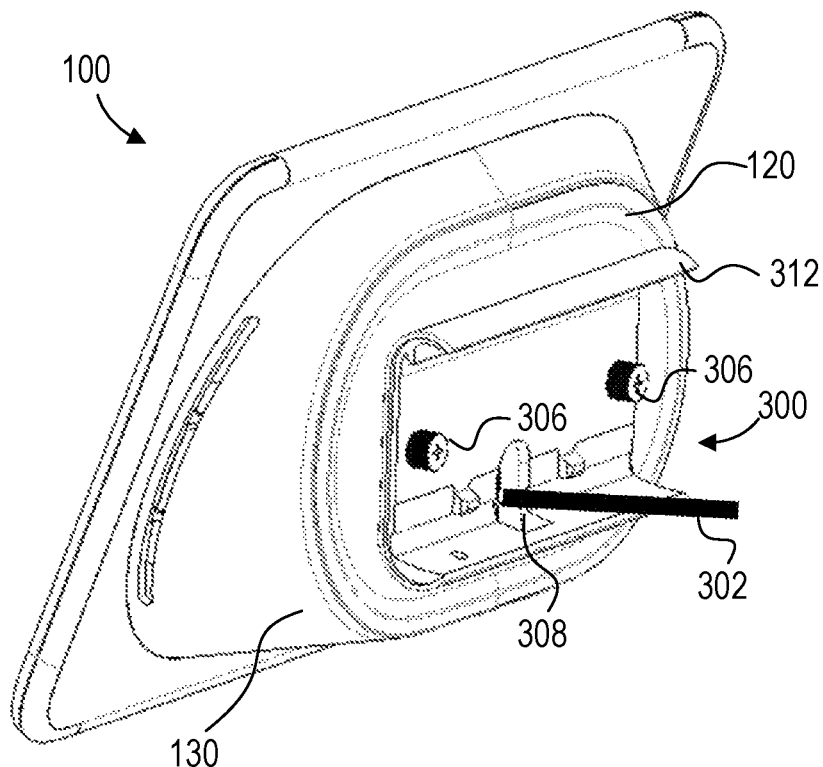
FIG. 3B illustrates the display device with a device-side mounting bracket attached in accordance with one embodiment.

FIGS. 3A-3B illustrate a device-side mounting bracket 300 that can be attached to the back of the display device 100 and used to mount the display device 100 in a variety of configurations. Particularly, FIG. 3A illustrates an exploded view showing the device-side bracket 300 aligned for attachment to the display device 100, and FIG. 3B illustrates the device-side bracket 300 attached to the display device 100. The device-side bracket 300 comprises a flat mounting surface with hooked top and bottom edges 312 that extend away from the back of the display device 100. The device-side bracket 300 furthermore comprises fastener holes 310 and a cable pass-through 308. To attach the device-side bracket 300 to the display device 100, the device-side bracket 300 is aligned with the back cover 120 of the display device 100 such that the fastener holes 310 of the device-side wall bracket 300 are aligned with the fastener pass-throughs 122 of the removable back cover 120 and the fastener holes 134 internal to the wedge base 130. Furthermore, the cable pass-through 308 of the device-side bracket 300 is aligned with the cable pass-through 124 of the removable back cover 120 and the cable 302 is fed through both pass-throughs 124, 308. The device-side wall bracket 300 is then secured to the removable back cover 120 of the display device 120 using a pair of fasteners 306 (e.g., screws) that couple to the fastener holes 134 internal to the wedge base 130 through the fastener pass-throughs 122 on the removable back cover 120.

Figure 4A:
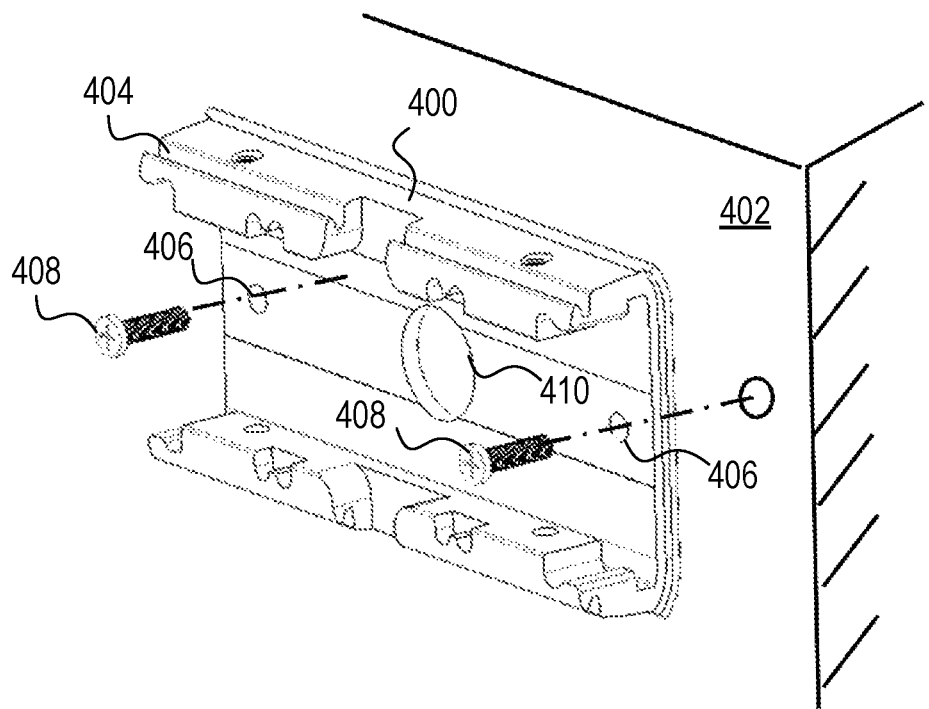
FIG. 4A illustrates a short wall-side bracket in accordance with one embodiment.
Figure 4B:
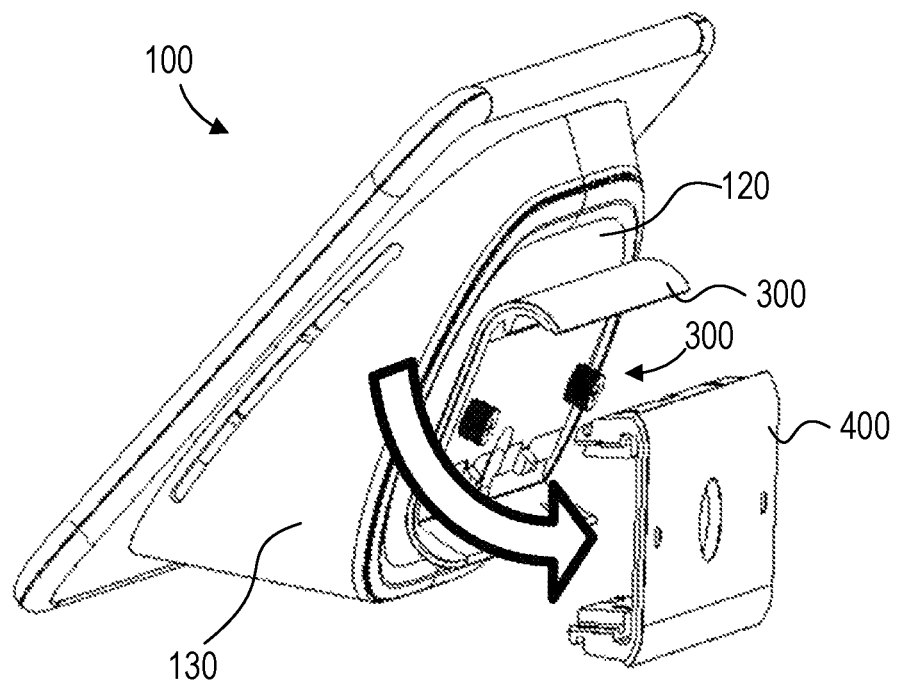
FIG. 4B illustrates the display device being coupled to a short wall-side bracket in accordance with one embodiment.

FIG. 4A-D illustrate a mounting configuration for mounting the display device 100 against a flat wall 402 or other vertical surface. As illustrated in FIG. 4A, a first embodiment of a wall-side bracket 400 (e.g., a short wall-side bracket) has a flat back surface for contacting the wall 402 and top and bottom edges that protrude away from the wall and include grooves 404 that are structured to securely couple with the hook-shaped edges of the device-side bracket 300. The wall-side bracket 400 furthermore includes one or more fastener holes 406 and a cable pass-through 410. The wall-side bracket 400 is secured to the wall 402 using fasteners 406 passing through the fastener holes 408. FIG. 4B illustrates the display device 100 being coupled to the wall-side bracket 400 by interlocking the hooked edges 312 of the device-side bracket 300 with the grooves 404 of the wall-side bracket 400. A cable coupled to the electrical interface 140 behind the removable back cover 120 may pass through the pass-through 124 on the back cover 120, through the pass-through 308 on the device-side bracket 300, through the pass-through 410 on the wall-side bracket 400 and into the wall 402 where it may be routed to a power source, server, or other connected device.

Figure 4C:
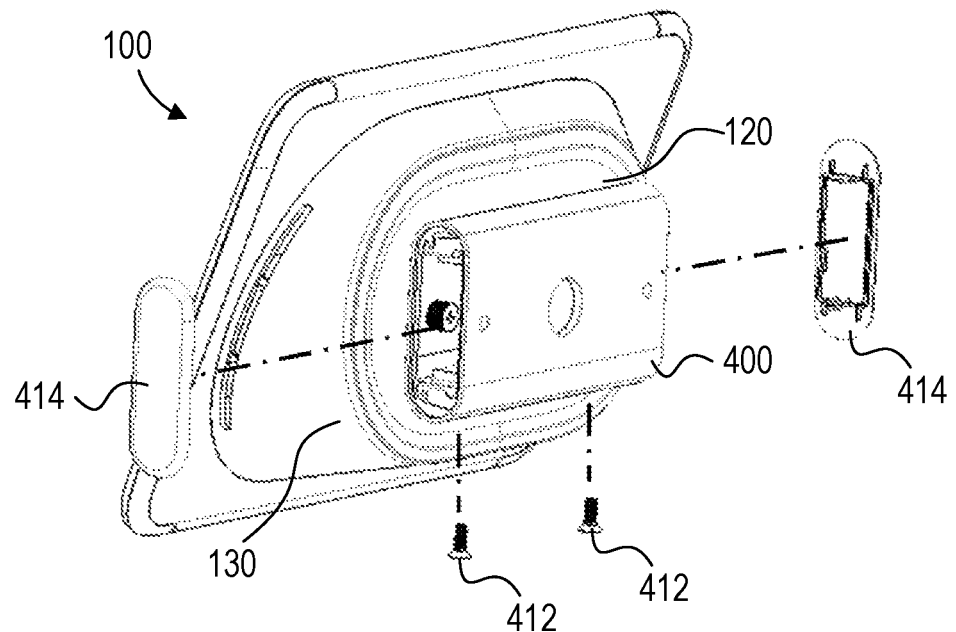
FIG. 4C illustrates end caps and fasteners being coupled to the short wall-side bracket and the device-side bracket in accordance with one embodiment.
Figure 4D:
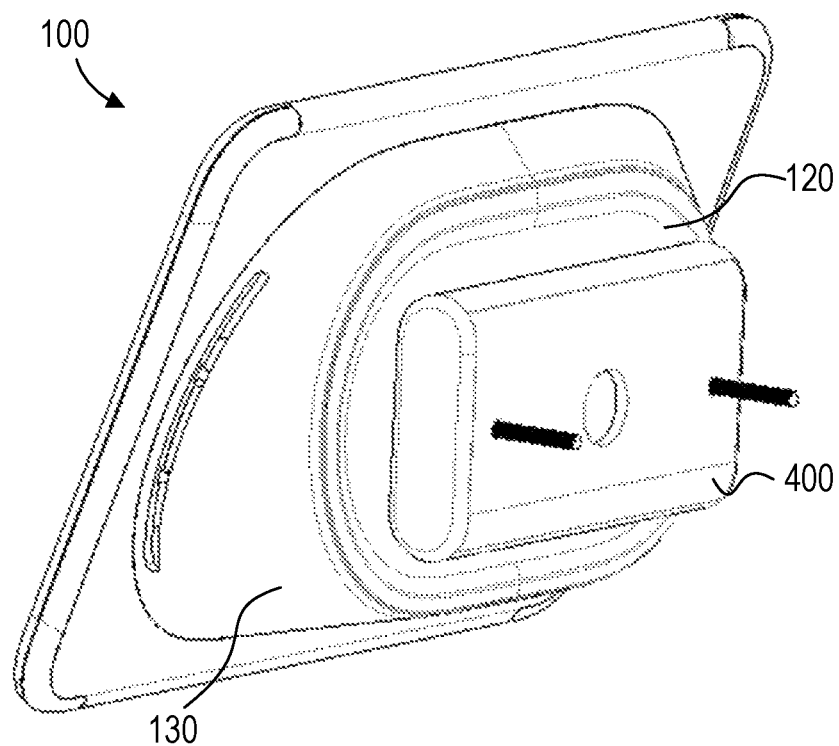
FIG. 4D illustrates the display device mounted to a wall using the short wall-side bracket in accordance with one embodiment.

As illustrated in FIG. 4C, a pair of bottom fasteners 412 (e.g., screws) or other securing mechanism may be used to further secure the device-side bracket 300 with the wall-side bracket 400. Furthermore, end caps 414 may be inserted along the vertical edges of the device-side bracket 300 and wall-side bracket 400 to enclose the gap between the brackets 300, 400. FIG. 4D illustrates the fully assembled mounting configuration of the display device 100 secured to a wall using the device-side bracket 300 in conjunction with the wall-side bracket 400.

Figure 5A:
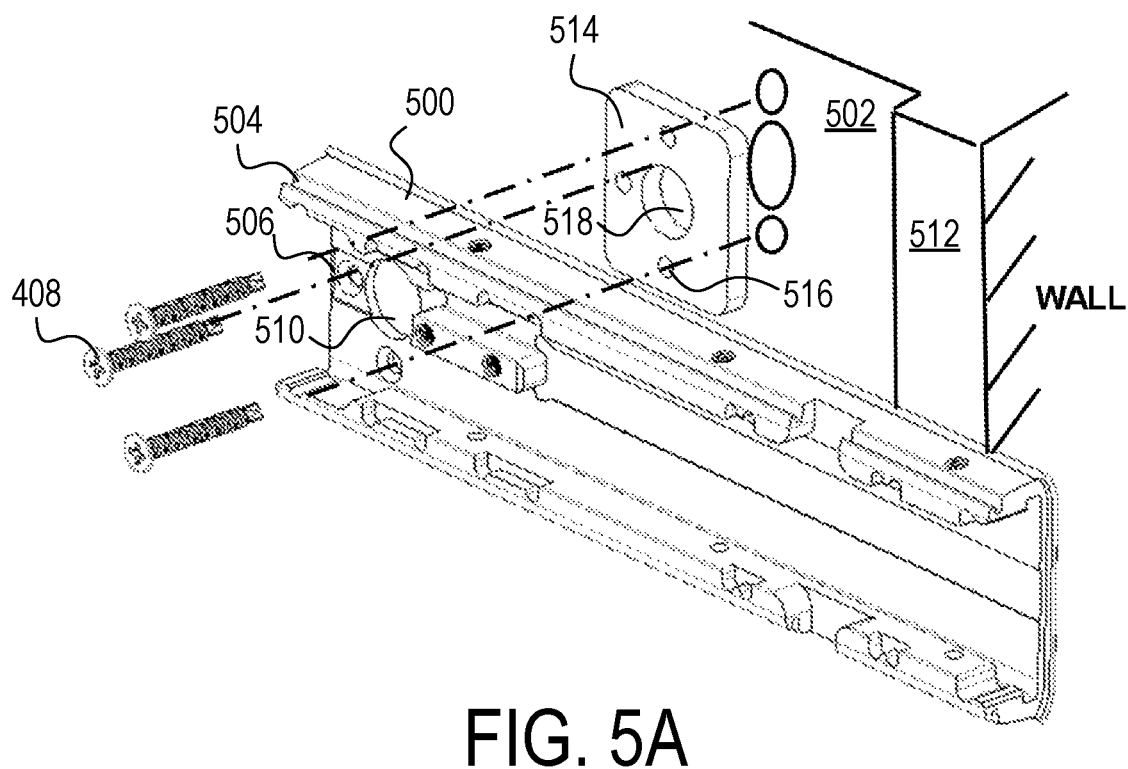
FIG. 5A illustrates an extended wall-side bracket and spacer being secured to a mounting surface in accordance with one embodiment.

FIGS. 5A-5E illustrate another mounting configuration for securing the display device 100 to a wall 502 adjacent to a door jamb 512 or other offset vertical surface. As illustrated in FIG. 5A, a second embodiment of a wall-side bracket 500 (e.g., an "extended bracket") has a flat back surface and top and bottom edges that protrude away from the wall and include grooves 504 that are structured to securely couple with the hook-shaped edges 312 of the device-side bracket 300. The wall-side bracket 500 may be elongated relative to the wall-side bracket 400 of FIGS. 4A-D in order to mount the display device 100 in a position offset from where the wall-side bracket 500 is secured to the wall 502. The wall-side bracket 500 furthermore includes one or more fastener holes 506 and a cable pass-through 510. To provide a flat mounting surface on a wall 502 having a protruding portion 512 such as a door jamb that extends out from the wall 502, a spacer 514 having the same approximate depth as the protruding portion 512 may be placed between the wall 502 and a first portion of the wall-side bracket 500 on one side, while a second portion of the wall-side bracket 500 on the other side is placed in direct contact with the protruding portion 512 of the wall 502. The spacer 514 also comprises fastener holes 516 and a cable hole 518. The wall-side bracket 500 may thus be secured to the wall 502 using fasteners 408 (e.g., screws) through fastener holes 506 of the wall-side bracket 500 and the fastener holes 516 of the spacer 514 as illustrated in FIG. 5A. For convenience, the fasteners 408 used to secure the wall-side bracket 500 to the wall 502 may be the same size fasteners 408 used to the secure the wall-side bracket 400 to the wall 402 in the embodiment of FIGS. 4A-D. A cable coupled to the electrical interface 140 behind the removable back cover 120 may pass through the pass-through 124 on the back cover 120, through the pass-through 308 on the device-side bracket 300, through the cable pass-through 510 on the wall-side bracket 500, through the cable pass-through 518 on the spacer 514, and into the wall 502 where it may be routed to a power source, server, or other connected device.

Figure 5B:
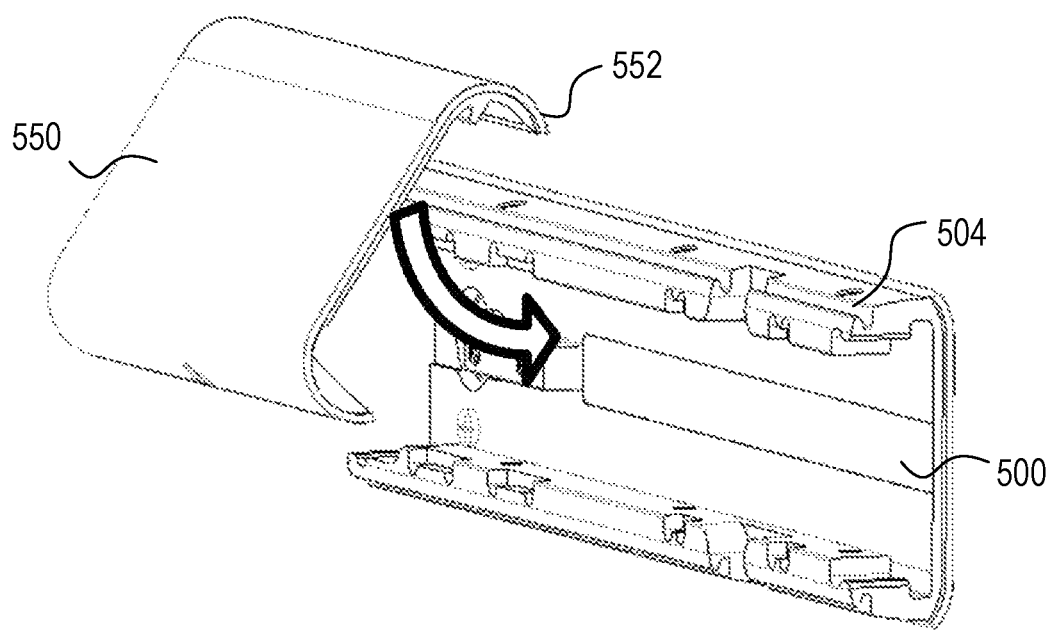
FIG. 5B illustrates a cover panel being coupled to the extended wall-side bracket in accordance with one embodiment.

As illustrated in FIG. 5B, a cover panel 550 having hooked edges 552 similar to the device-side bracket 300 may then attach to the wall-side bracket 500 by mating the hooked edges 552 with the grooves 504 of the wall-side bracket 500 such that the cover panel 550 covers the end of the wall-side bracket 500 secured to the wall 502.

Figure 5C:
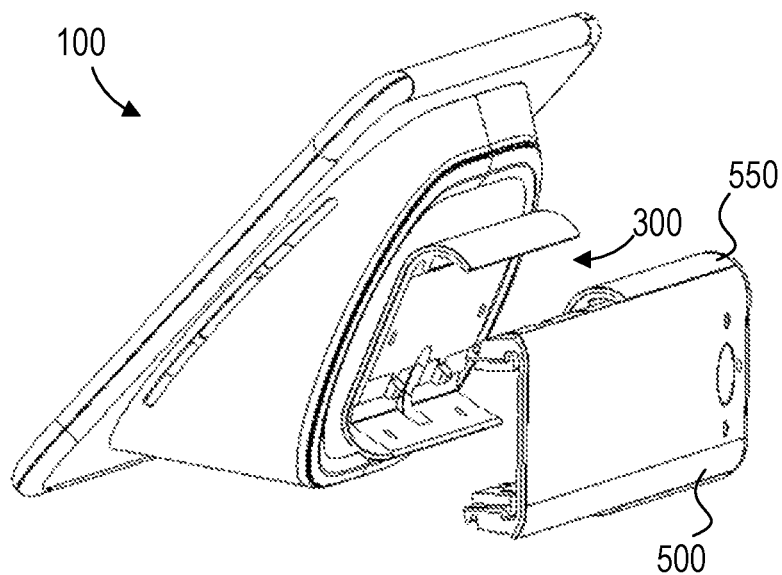
FIG. 5C illustrates the device-side bracket being coupled to the extended wall-side bracket in accordance with one embodiment.

As illustrated in FIG. 5C, the device-side bracket 300 (attached to the display device 100) may then be attached to the wall-side bracket 500 by mating the hooked edges 312 of the device-side bracket 300 with the grooves 504 of the wall-side bracket 500 on the opposite end of the wall-side bracket 500 from where it attaches to the wall 502. Thus, the display panel 100 is mounted against the wall 502 at a position offset from where the wall-side bracket 500 is secured to the wall 502 and may be positioned over a door jamb or other protruding surface 512.

Figure 5D:
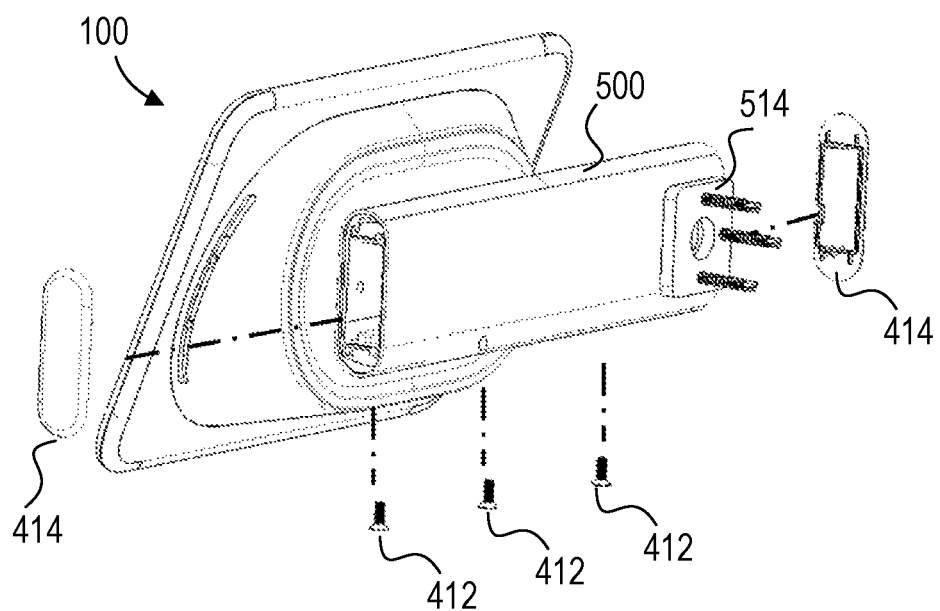
FIG. 5D illustrates end caps and fasteners being coupled to the extended wall-side bracket and the device-side bracket in accordance with one embodiment.
Figure 5E:
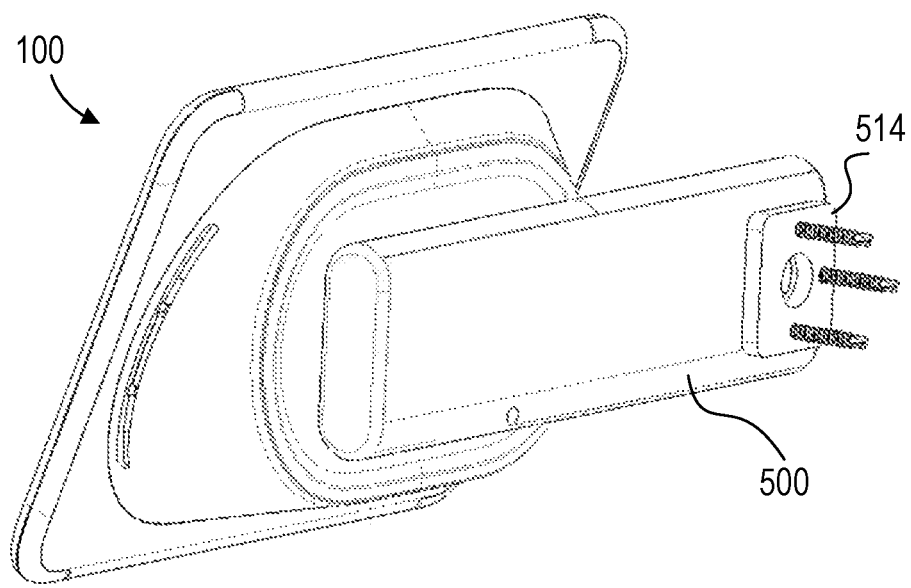
FIG. 5E illustrates the display device mounted to a wall using the extended wall-side bracket and the spacer in accordance with one embodiment.

As illustrated in FIG. 5D, the fasteners 412 may then secure through bottom fastener holes on the wall-side bracket 500 and the device-side bracket 300 to further secure the wall-side bracket 500 to the device-side bracket 300 and to the cover plate 550. End caps 414 may be secured into each end to cover the spaces between the device-side bracket 300 and the wall-side bracket 500 and between the cover panel 550 and wall-side bracket 500 in a similar manner as described above. For convenience, the fasteners 412 and the end caps 414 may be the same as those that are used for a similar purpose in the mounting configuration of FIGS. 4A-D described above. FIG. 5E illustrates the completed mount of the display device 100 using the wall-side bracket 500 and spacer 514.

In the embodiment of FIGS. 5A-5E, the wall-side bracket 500 may beneficially be symmetric about the horizontal axis. This enables the display device 100 to be mounted to the left of the protruding surface 512 when in the orientation of FIGS. 5A-5E, or may be mounted to the right of the protruding surface 512 when the wall-side bracket 500 is rotated 180 degrees.

In an alternative embodiment, the spacer 514 may be first secured to the wall 502 using a first set of fasteners through a first set fastener holes prior to attaching the wall-side bracket 500 to the spacer 514 using a second set of fasteners through a second set of fastener holes.

Figure 6A:
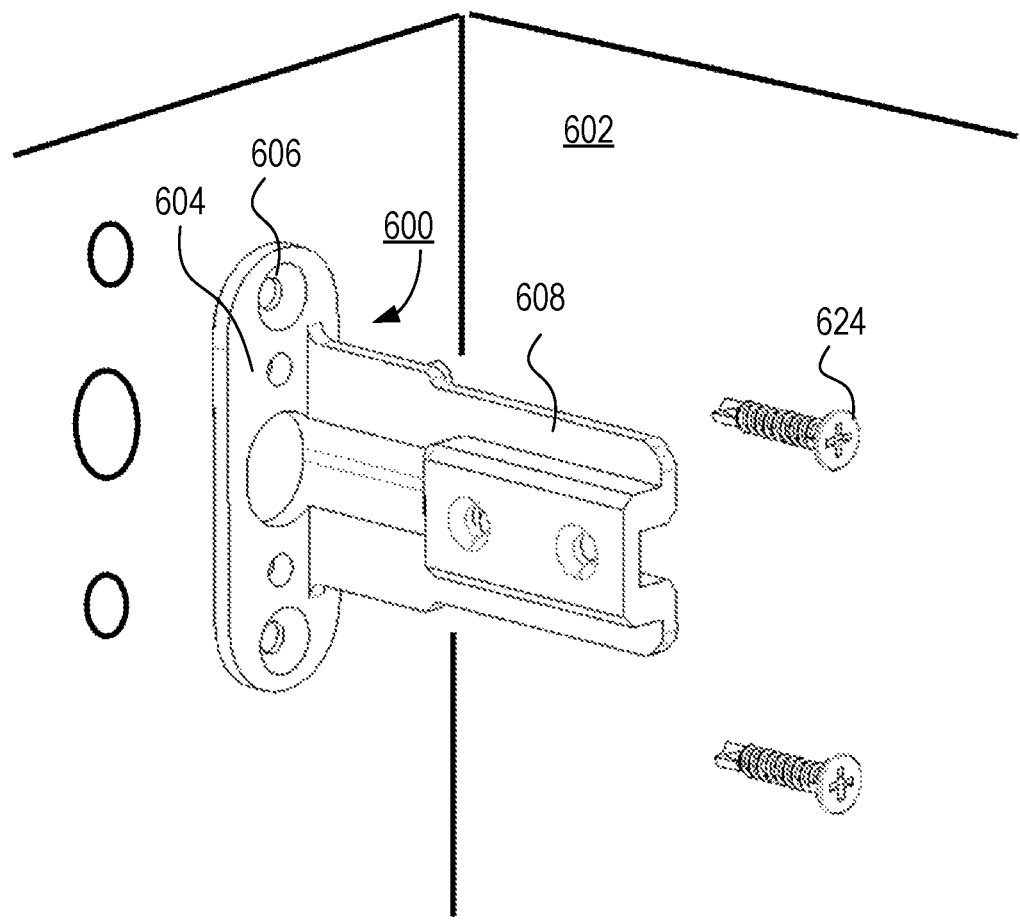
FIG. 6A illustrates a side mount being secured to a mounting surface in accordance with one embodiment.
Figure 6B:
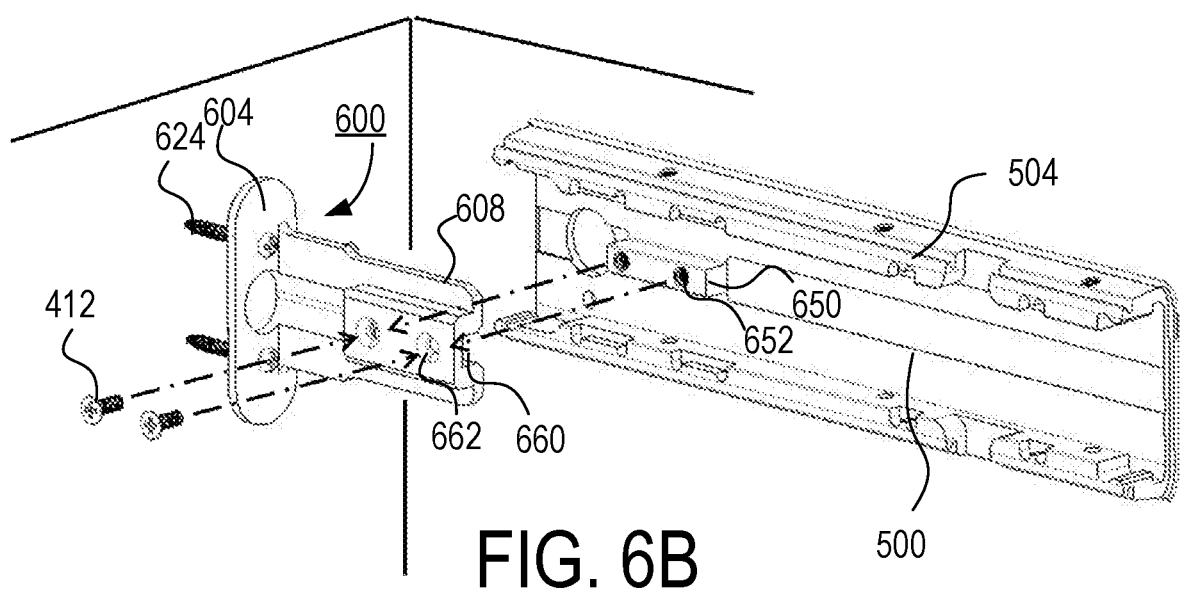
FIG. 6B illustrates the extended wall-side bracket being secured to the side mount in accordance with one embodiment.
Figure 6C:
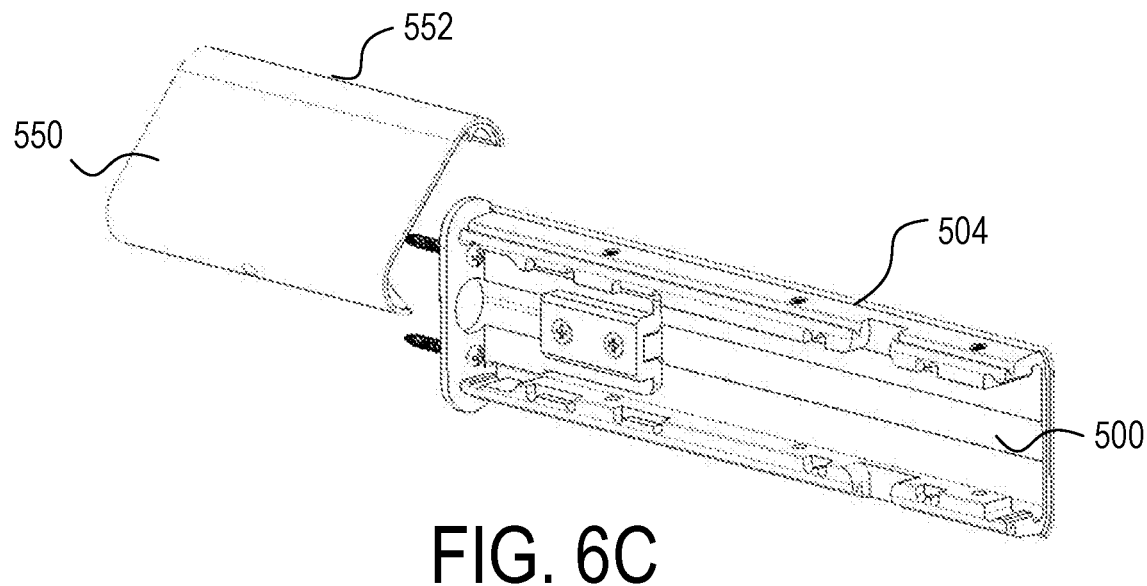
FIG. 6C illustrates a cover panel being coupled to the extended wall-side bracket in accordance with one embodiment.

FIGS. 6A-6F illustrate a mounting configuration using a side mount 600 together with the wall-side bracket 500 in order to mount the display device 100 perpendicular to a wall 602 or other vertical mounting surface. As illustrated in FIG. 6A, the side mount 600 includes a base plate 604 that contacts the wall 602 and a mounting arm 608 that extends substantially perpendicular from the base plate 604. The base plate 604 is secured to the wall 602 via fasteners 624 (e.g., screws) through fastener holes 606. As illustrated in FIG. 6B, the wall-side bracket 500 includes a protrusion 650 that mates with a notch 660 in the mounting arm 608 of the side mount 600 and may be secured using fasteners 412 (which may be the same fasteners 412 used in the previous embodiments) via fastener holes 662 through the notch 660 and the protrusion 650. In this manner, the wall-side bracket 500 is secured in an orientation extending substantially perpendicular to the wall 602.

As illustrated in FIG. 0.6C, the cover panel 550 may then attach to the wall-side bracket 500 by mating the hooked edges 552 with the grooves 504 of the wall-side bracket 500 such that the cover panel 550 covers the end of the wall-side bracket 500 secured to the wall 602.

Figure 6D:
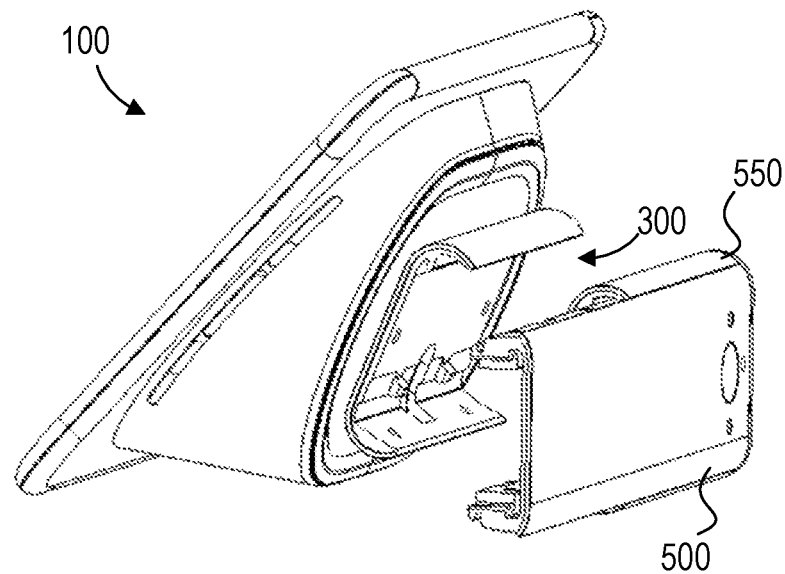
FIG. 6D illustrates the device-side bracket being coupled to the extended wall-side bracket in accordance with one embodiment.
Figure 6E:
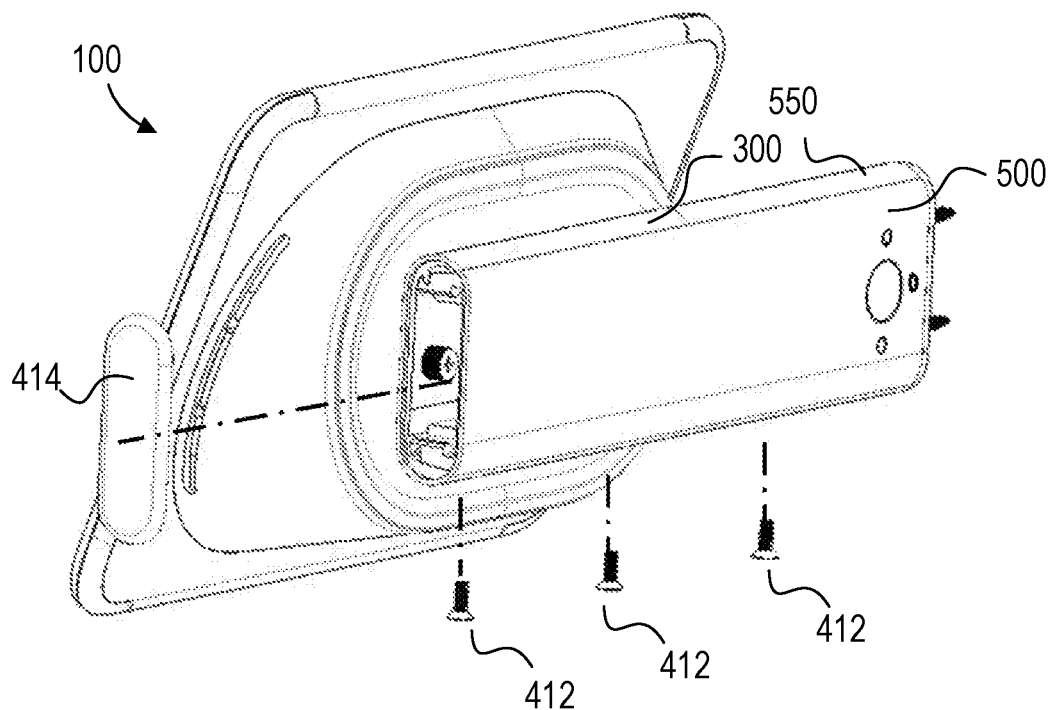
FIG. 6E illustrates an end cap and fasteners being coupled to the extended wall-side bracket and the device-side bracket in accordance with one embodiment.
Figure 6F:
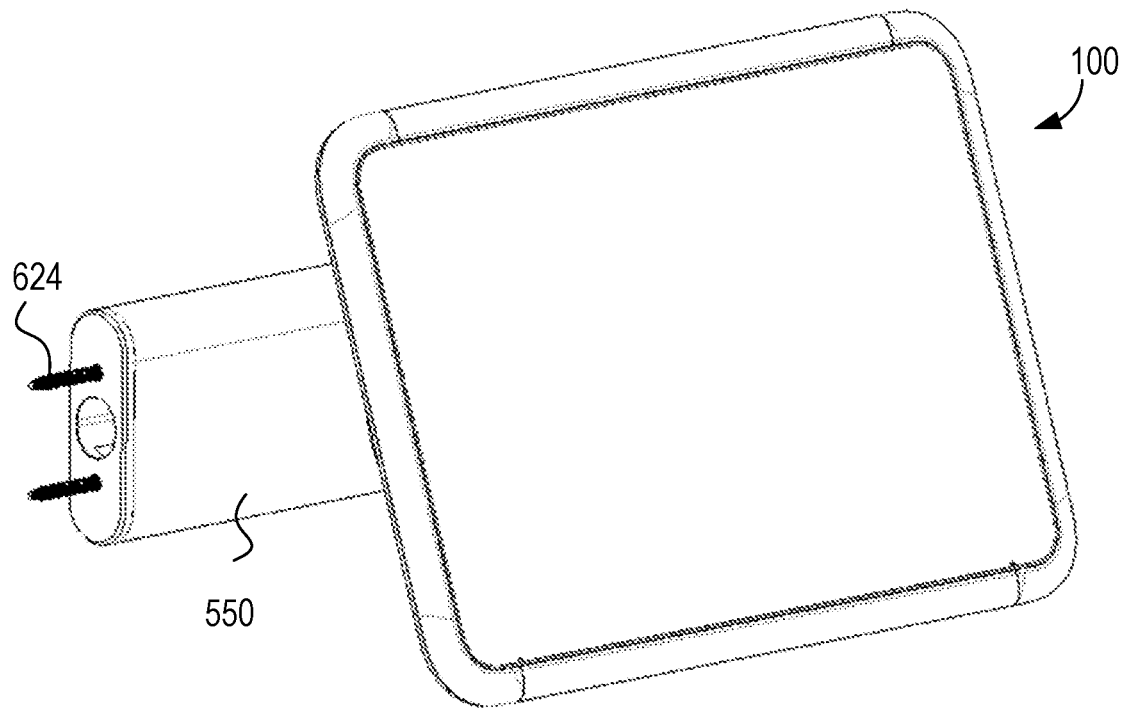
FIG. 6F illustrates the display device mounted to a wall using the extended wall-side bracket and the side mount in accordance with one embodiment.

As illustrated in FIG. 6D, the device-side bracket 300 (attached to the display device 100) may be attached to the wall-side bracket 500 by mating the hooked edges 312 of the device-side bracket 300 with the grooves 504 of the wall-side bracket 500 in the same manner described above. Furthermore, as illustrated in FIG. 6E, fasteners 412 (which may be the same fasteners 412 described in the previous embodiments) may then secure through bottom fastener holes on the wall-side bracket 500 and the device-side bracket 300 to further secure the wall-side bracket 500 to the device-side bracket 300 in the same manner described above. End caps 414 (which may be the same end caps 414 described in the previous embodiments) may be secured into the open end (opposite the wall 602) to cover the space between the device-side bracket 300 and the wall-side bracket 500 in a similar manner as described above. FIG. 6F illustrates the completed side mount of the display device 100 using the side mount 600 and the wall-side bracket 500.

In each of the mounting configurations of FIGS. 4A-D, 5A-E, 6A-F, and 6A-F, the display device 100 is oriented such that the side of the display panel 110 opposite the side of the wedge base having less depth corresponds to the top of the display panel 110 such that the edge of the display panel 110 furthest from the mounting surface corresponds to the top of the displayed images, in contrast to the embodiment of FIGS. 2A-C. The display device 100 may automatically detect this orientation and configure the display panel 110 to display the top of the images at the top side of the display panel 110 so as to properly orient the images for the viewer.

Beneficially, a variety of mounting configurations for mounting the display device 100 can be achieved using a limited number of components that can be used in different ways in different configurations. Particularly, the display device 100 can be configured to rest on a desktop, table top, or other horizontal surface (FIGS. 3A-B), flat against a uniform wall or other horizontal surface (FIGS. 4A-D), against a wall having an offset surface such as a door jamb with varying depths (FIGS. 5A-E and FIGS. 6A-F), or perpendicular to a wall (FIGS. 6A-6F). All of these configurations can be achieved using a limited number of multi-purposed mounting components including a device-side bracket 300, a first wall-side bracket 400, a second wall-side bracket 500, a spacer 514, a side mount 600, end caps 414, and several sizes of fasteners 306, 408, 412, 624. In an embodiment, a mounting kit for mounting in all of the above-described configurations may consist only of the above-mentioned parts.

In alternative embodiments, the mounting kit may be used to mount other devices that are not necessarily a display device such as a displayless input device or audio device.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A display system comprising:
    a display device comprising:
        a display panel for displaying images;
        a wedge base extending from a back of the display panel, the wedge base having a depth that increases with distance from an edge of the display panel;
        an electrical interface in a cavity of the wedge base for coupling to a data cable; and
        a removable back cover to mate with outer edges of the back of the wedge base, the removable back cover comprising one or more fastener pass-throughs to enable a fastener to pass through the removable back cover and secure to the back of the wedge base, and the removable back cover comprising one or more cable pass-throughs to enable the data cable to pass through the removable back cover to couple to the electrical interface; and
    a mounting kit comprising:
        a device-side bracket structured to couple to a back of the wedge base, the device-side bracket including a first mating structure;
        a wall-side bracket structured to couple to a mounting surface, the wall-side bracket including a second mating structure structured to mate with the first mating structure to secure the device-side bracket to the wall-side bracket.

2. The display system of claim 1, wherein the wedge base comprises a substantially oval cross-section.

3. A display system comprising:
a display device comprising:
a display panel for displaying images;
a wedge base extending from a back of the display panel, the wedge base having a depth that increases with distance from an edge of the display panel; and
an electrical interface in a cavity of the wedge base for coupling to a data cable; and
a mounting kit comprising:
a device-side mounting bracket structured to couple to a back of the wedge base,
wherein the device-side mounting bracket comprises:
a device-side flat plate for contacting a back surface of the display device, the device-side flat plate including one or more fastener holes to enable one or more device-side fasteners to secure the device-side flat plate to the back surface of the display device; and
a first mating structure comprising horizontal hooked edges extending away from the back surface of the display device for mating with a second mating structure;
a wall-side bracket structured to couple to a mounting surface, the wall-side bracket including the second mating structure structured to mate with the first mating structure to secure the device-side bracket to the wall-side bracket.

4. The display system of claim 3, wherein the wall-side bracket comprises:
a wall-side flat plate, and
wherein the second mating structure comprises horizontal grooves adjacent to top and bottom edges of the wall-side flat plate for mating the first mating structure of the device-side bracket.

5. The display system of claim 4, further comprising:
an end cap to secure to respective vertical edges of the device-side bracket and the wall-side bracket to cover a gap between the device-side flat plate of the device-side bracket and the wall-side flat plate of the wall-side bracket.

6. The display system of claim 4, wherein the wall-side bracket and the device-side bracket have approximately the same length and width, and wherein mounting fasteners for mounting the wall-side bracket to the mounting surface are positioned so that the mounting fasteners secure to the mounting surface directly behind the display device.

7. The display system of claim 4, wherein the wall-side bracket has a greater length than the device-side bracket, and wherein the grooves of the wall-side bracket are longer than the hooked edges of the device-side bracket, and wherein the mounting fasteners for mounting the wall-side bracket are positioned so that the mounting fasteners pass through a first portion of the wall-side bracket, and wherein the device-side bracket couples to a second portion of the wall-side bracket such that the display device is laterally offset from the mounting fasteners.

8. The display system of claim 7, further comprising:
a cover panel having a cover panel flat plate and hooked edges, the cover panel to secure to the first portion of the wall-side bracket over the mounting fasteners.

9. The display system of claim 7, wherein the mounting surface comprises a base surface and a protruding surface protruding from the base surface, the display further comprising:

a spacer between the first portion of the wall-side bracket and the base surface of the mounting surface, the spacer having an approximately same depth as the protruding surface,
wherein the display device is positioned over the protruding surface.

10. The display system of claim 9, wherein the mounting fasteners pass through the wall-side mounting bracket and the spacer to secure the wall-side mounting bracket and the spacer to the base surface.

11. The display system of claim 9, wherein the mounting fasteners comprise:
first fasteners to secure the spacer to the base surface; and
second fasteners to secure the wall-side mounting bracket to the spacer.

12. The display system of claim 7, wherein the first portion of the wall-side bracket comprises a protrusion in between the grooves of the wall-side flat plate, wherein the mounting kit further comprises:
a side mount having a base plate to secure to the mounting surface and a mounting arm extending approximately perpendicular to the base plate and the mounting surface, the mounting arm having a notch portion to mate with the protrusion of the wall-side bracket, and the wall-side bracket to secure to the side mount via the mounting fasteners through the protrusion and the notch portion such that the mounting arm is between the device-side bracket and the wall-side bracket.

13. The display system of claim 7, wherein the mounting kit further comprises:
a side mount having a base plate to secure to the mounting surface and a side arm extending approximately perpendicular to the base plate and the mounting surface, an extended wall-side bracket to secure to the side mount via the mounting fasteners through a protrusion and a notch such that a mounting arm is between the device-side bracket and the extended wall-side bracket.

14. A mounting kit for mounting a device to a mounting surface, the mounting kit comprising:
a device-side bracket structured to couple to a back of the device, the device-side bracket comprising:
a device-side flat plate for contacting a back surface of the device, the device-side flat plate including one or more fastener holes to enable one or more device-side fasteners to secure the device-side flat plate to the back surface of the display device; and
horizontal hooked edges extending away from the back surface of the device; and
an extended wall-side bracket including:
a wall-side flat plate having a greater horizontal length than the device-side flat plate of the device-side bracket;
mounting fastener holes through a first portion of the extended wall-side bracket;
horizontal grooves adjacent to top and bottom edges of the wall-side flat plate for mating with the hooked edges of the device-side bracket on a second portion of the extended wall-side bracket laterally offset from the mounting fastener holes, such that the device is mountable laterally offset from the mounting holes;
a protrusion in between the grooves of the wall-side flat plate on the first portion of the extended wall-side bracket, the protrusion for mating with a reciprocal notch of a side mount,
wherein the extended wall-side bracket is mountable in a first mounting configuration such that the wall-side flat plate contacts the mounting surface and the mounting fasteners pass through the mounting holes to secure the wall-side flat plate to the mounting surface, and wherein the extended wall-side bracket is mountable in a second mounting configuration such that the wall-side flat plate is perpendicular to the mounting surface and the mounting fasteners pass through the mounting holes to secure the wall-side flat plate to a side arm of the side mount extending perpendicular to the mounting surface.

15. The mounting kit of claim 14, further comprising a short wall-side bracket having approximately the same length and width as the device-side bracket, the short wall-side bracket having grooves to mate with the hooked edges of the device-side bracket.

16. The mounting kit of claim 14, further comprising:
a cover panel having a cover panel flat plate and hooked edges, the cover panel to secure to the first portion of the extended wall-side bracket over the mounting fasteners.

17. The mounting kit of claim 14, wherein the mounting surface comprises a base surface and a protruding surface protruding from the base surface, the mounting kit further comprising:
a spacer between the first portion of the extended wall-side bracket and the base surface of the mounting surface, the spacer having an approximately same depth as the protruding surface, and wherein the extended wall-side bracket secures the device in a position over the protruding surface.

18. The mounting kit of claim 17, wherein the mounting fasteners pass through the extended wall-side mounting bracket and the spacer to secure the extended wall-side mounting bracket and the spacer to the base surface.

19. The mounting kit of claim 17, wherein the mounting fasteners comprise:
first fasteners to secure the spacer to the base surface; and
second fasteners to secure the wall-side mounting bracket to the spacer.

* * * * *